(12) United States Patent
Sano et al.

(10) Patent No.: US 8,821,763 B2
(45) Date of Patent: *Sep. 2, 2014

(54) ACTIVE MATERIAL AND METHOD OF MANUFACTURING ACTIVE MATERIAL

(75) Inventors: Atsushi Sano, Tokyo (JP); Keitaro Otsuki, Tokyo (JP); Yosuke Miyaki, Tokyo (JP); Takeshi Takahashi, Tokyo (JP); Tohru Inoue, Tokyo (JP); Akiji Higuchi, Kyoto (JP)

(73) Assignee: TDK Corporation, Tokyo (JP)

( * ) Notice: Subject to any disclaimer, the term of this patent is extended or adjusted under 35 U.S.C. 154(b) by 695 days.

This patent is subject to a terminal disclaimer.

(21) Appl. No.: 12/568,145

(22) Filed: Sep. 28, 2009

(65) Prior Publication Data

US 2010/0078591 A1    Apr. 1, 2010

(30) Foreign Application Priority Data

Sep. 30, 2008  (JP) ................................ 2008-254340
Sep. 30, 2008  (JP) ................................ 2008-254365

(51) Int. Cl.
*H01M 4/48* (2010.01)
*H01M 4/88* (2006.01)
*H01B 11/08* (2006.01)
*H01M 4/58* (2010.01)
*H01M 4/587* (2010.01)
*H01M 4/36* (2006.01)
*H01M 10/0525* (2010.01)

(52) U.S. Cl.
CPC ........ *H01M 4/5825* (2013.01); *H01M 10/0525* (2013.01); *H01M 4/587* (2013.01); *Y02E 60/12* (2013.01); *H01M 4/366* (2013.01)
USPC .................. 252/506; 252/182.1; 429/218.15; 429/231.5; 429/231.8; 429/231.95

(58) Field of Classification Search
USPC .............................................. 252/506, 182.1
See application file for complete search history.

(56) References Cited

U.S. PATENT DOCUMENTS 6,528,033 B1   3/2003   Barker et al.
6,702,961 B2   3/2004   Barker et al.

(Continued)

FOREIGN PATENT DOCUMENTS

CN       101279727 A    10/2008
EP       1 850 409 A1   10/2007

(Continued)

OTHER PUBLICATIONS

Liang et al. "Lithium iron phosphate with high-rate capability synthesized through hydrothermal reaction in glucose solution", Journal of Power Sources, 184, (2008), 538-542.*

(Continued)

*Primary Examiner* — Peter F Godenschwager
(74) *Attorney, Agent, or Firm* — Oliff PLC

(57) ABSTRACT

An active material capable of forming an electrochemical device excellent in its discharge capacity and rate characteristic is provided. The active material in accordance with a first aspect of the present invention comprises a compound particle containing a compound having a composition represented by the following chemical formula (1), a carbon layer covering the compound particle, and a carbon particle. The active material in accordance with a second aspect of the present invention comprises a carbon particle and a compound particle having an average primary particle size of 0.03 to 1.4 μm, being carried by the carbon particle, and containing a compound represented by the following chemical formula (1):

$$Li_aMXO_4 \quad (1)$$

where a satisfies 0.9≤a≤2, M denotes one species selected from the group consisting of Fe, Mn, Co, Ni, and VO, and X denotes one species selected from the group consisting of P, Si, S, V, and Ti.

16 Claims, 5 Drawing Sheets

(56) References Cited

U.S. PATENT DOCUMENTS

| | | | |
|---|---|---|---|
| 6,716,372 B2 | 4/2004 | Barker et al. | |
| 6,730,281 B2 | 5/2004 | Barker et al. | |
| 7,060,206 B2 | 6/2006 | Barker et al. | |
| 7,276,218 B2 | 10/2007 | Barker et al. | |
| 7,337,010 B2 | 2/2008 | Howard et al. | |
| 7,550,098 B2 | 6/2009 | Barker et al. | |
| 7,635,541 B2 | 12/2009 | Scott et al. | |
| 7,682,745 B2 | 3/2010 | Howard et al. | |
| 7,807,299 B2 | 10/2010 | Howard et al. | |
| 7,811,705 B2 | 10/2010 | Scott et al. | |
| 7,829,242 B2 | 11/2010 | Hörpel et al. | |
| 7,875,389 B2 | 1/2011 | Scott et al. | |
| 7,927,742 B2 | 4/2011 | Scott et al. | |
| 8,105,714 B2 | 1/2012 | Schmidt et al. | |
| 8,105,733 B2 | 1/2012 | Hoerpel et al. | |
| 8,163,441 B2 | 4/2012 | Hoerpel et al. | |
| 8,383,269 B2 | 2/2013 | Scott et al. | |
| 8,449,980 B2 | 5/2013 | Suzuki et al. | |
| 8,492,031 B2 | 7/2013 | Suzuki et al. | |
| 2002/0041998 A1* | 4/2002 | Hosoya et al. | 429/221 |
| 2002/0182497 A1* | 12/2002 | Kohzaki et al. | 429/221 |
| 2005/0255026 A1 | 11/2005 | Barker et al. | |
| 2006/0093871 A1* | 5/2006 | Howard et al. | 429/9 |
| 2007/0001153 A1 | 1/2007 | Barker et al. | |
| 2008/0020277 A1 | 1/2008 | Barker et al. | |
| 2008/0020278 A1 | 1/2008 | Schmidt et al. | |
| 2008/0044728 A1 | 2/2008 | Schmidt et al. | |
| 2008/0206639 A1* | 8/2008 | Kurihara | 429/209 |
| 2008/0268339 A1 | 10/2008 | Suzuki | |
| 2009/0068080 A1 | 3/2009 | Faulkner | |
| 2009/0087660 A1 | 4/2009 | Suzuki et al. | |
| 2009/0155689 A1 | 6/2009 | Zaghib et al. | |
| 2009/0236564 A1 | 9/2009 | Yasunaga et al. | |
| 2009/0274849 A1 | 11/2009 | Scott et al. | |
| 2010/0081058 A1 | 4/2010 | Sano et al. | |
| 2010/0233545 A1 | 9/2010 | Sano et al. | |
| 2010/0316898 A1 | 12/2010 | Howard et al. | |
| 2011/0052995 A1 | 3/2011 | Sano et al. | |
| 2011/0133118 A1 | 6/2011 | Honma et al. | |
| 2013/0153821 A1 | 6/2013 | Evenson et al. | |

FOREIGN PATENT DOCUMENTS

| | | |
|---|---|---|
| JP | A-5-159807 | 6/1993 |
| JP | A-11-329427 | 11/1999 |
| JP | A-2002-110163 | 4/2002 |
| JP | A-2003-36889 | 2/2003 |
| JP | A-2003-68304 | 3/2003 |
| JP | A-2003-173777 | 6/2003 |
| JP | A-2003-203628 | 7/2003 |
| JP | A-2003-292308 | 10/2003 |
| JP | A-2003-292309 | 10/2003 |
| JP | A-2004-63386 | 2/2004 |
| JP | A-2004-95385 | 3/2004 |
| JP | A-2004-303527 | 10/2004 |
| JP | A-2005-123107 | 5/2005 |
| JP | A-2006-156256 | 6/2006 |
| JP | A-2006-302671 | 11/2006 |
| JP | A-2007-87841 | 4/2007 |
| JP | A-2007-109533 | 4/2007 |
| JP | B2-3933470 | 6/2007 |
| JP | A-2007-294461 | 11/2007 |
| JP | B2-4043852 | 2/2008 |
| JP | A-2008-517435 | 5/2008 |
| JP | A-2008-519399 | 6/2008 |
| JP | A-2009-298687 | 12/2009 |
| WO | WO 2007/113624 A1 | 10/2007 |

OTHER PUBLICATIONS

"Lithium iron phosphate with high-rate capability synthesized through hydrothermal reaction in glucose solution", Guangchuan Liang, et al., Journal of Power Sources, vol. 184, Feb. 29, 2008, pp. 538-542.

High-rate properties of LiFePO4/carbon composites as cathode materials for lithium-ion batteries, Akira Kuwahara, et al., Ceramics International, vol. 34, Sep. 29, 2007, pp. 863-866.

Azmi et al, "LiVOPO$_4$ as a New Cathode Materials for Li-ion Rechargeable Battery," Journal of Power Sources, vol. 146, pp. 525-528, 2005.

Barker et al., "Electrochemical Properties of Beta-LiVIPO$_4$ Prepared by Carbothermal Reduction," Journal of the Electrochemical Society, vol. 151, No. 12, pp. A796-A800, Apr. 26, 2004.

Dupre et al., "Positive electrode materials for lithium batteries based on VOPO$_4$," Solid State Ionics, vol. 140, pp. 209-221, 2001.

Dupre et al., "Electrochemical Performance of different Li-VOPO$_4$ systems," Journal of Power Sources, vol. 97-98, pp. 532-534, 2001.

Gaubicher et al., "Li/β-VOPO$_4$: A New 4 V System for Lithium Batteries," Journal of the Electrochemical Society, vol. 146, No. 12, pp. 4375-4379, Jul. 1999.

Kerr et al., "Highly Reversible Li Insertion at 4 V in ε-VOPO$_4$/α-LiVOPO$_4$ Cathodes," Electrochemical and Solid-State Letters, vol. 3, No. 10, pp. 460-462, 2000.

Lii et al., "Hydrothermal Synthesis, Structure, and Magnetic Properties of a New Polymorph of Lithium Vanadyl(IV) Orthophosphate: Beta-LiVOPO$_4$," Journal of Solid State Chemistry, vol. 95, pp. 352-359, 1991.

Nagamine et al,, "Selective Synthesis of Lithium Ion-Conductive Beta-LiVOPO$_4$ Crystals via Glass-Ceramic Processing," Journal of American Ceramic Society, vol. 91, No. 12, pp. 3920-3925, 2008.

U.S. Appl. No. 13/968,560, filed Aug. 16, 2013 in the name of Atsushi Sano et al.

Oct. 20, 2011 Office Action issued in U.S. Appl. No. 12/568,075.
Oct. 11, 2012 Office Action issued in U.S. Appl. No. 12/568,075.
Feb. 14, 2013 Office Action issued in U.S. Appl. No. 12/568,075.
Apr. 13, 2013 Office Action issued in U.S. Appl. No. 12/568,075.
Sep. 11, 2013 Office Action issued in U.S. Appl. No. 12/568,075.
Sep. 12, 2013 Office Action issued in U.S. Appl. No. 13/968,560.
Sep. 13, 2013 Office Action issued in U.S. Appl. No. 12/723,101.
Nov. 23, 2012 Office Action issued in U.S. Appl. No. 12/868,142.
Apr. 12, 2013 Office Action issued in U.S. Appl. No. 12/868,142.
Oct. 2, 2013 Office Action issued in U.S. Appl. No. 12/868,142.
Jan. 30, 2014 Office Action issued in U.S. Appl. No. 12/868,142.
Feb. 5, 2014 Office Action issued in U.S. Appl. No. 12/568,075.

* cited by examiner

ACTIVE MATERIAL AND METHOD OF MANUFACTURING ACTIVE MATERIAL

BACKGROUND OF THE INVENTION

1. Field of the Invention

The present invention relates to an active material and a method of manufacturing the active material.

2. Related Background Art

A polyanionic compound represented by $LiN_aMXO_4$ (where a is 1 or 2, M denotes one species selected from the group consisting of Fe, Mn, Co, Ni, and VO, and X denotes one species selected from the group consisting of P, Si, S, V, As, and Ti) is a promising positive electrode active material which can reversely insert and de-insert lithium. This polyanion compound has been known to exhibit a plurality of crystal structures such as triclinic (α-type) and orthorhombic (β-type) crystals and have different electrochemical characteristics according to the crystal structures.

In the polyanionic compound, electrons are strongly attracted to a tetrahedral skeleton of its crystal lattice, whereby metal atoms are isolated in the crystal lattice. Hence, the polyanionic compound has an ion binding property. Therefore, the polyanionic compound exhibits an electronic conductivity lower than that of other typical positive electrode active materials. Lithium-ion secondary batteries using such a polyanionic compound having a low electronic conductivity as a positive electrode active material have been problematic in that they fall short of yielding a capacity fully on a par with a theoretical capacity or exhibit a rate characteristic lower than that in the case using an Li-based laminar compound as a positive electrode active material.

An example of methods for imparting electronic conductivity to the polyanionic compound is one which combines the polyanionic compound with an electro-conductive agent such as carbon. Specific examples include a method of mixing a particle made of the polyanionic compound with carbon, a method of mixing a polyanionic compound precursor with carbon at the time of making the polyanionic compound, and a method of firing the polyanionic compound together with carbon, so that the polyanionic compound carries carbon (see Japanese Patent Application Laid-Open No. 05-159807 (Literature 1), Japanese Patent Application Laid-Open No. 11-329427 (Literature 2), Japanese Patent Application Laid-Open No. 2002-110163 (Literature 3), Japanese Patent Application Laid-Open No. 2003-203628 (Literature 4), Japanese Patent Application Laid-Open No. 2003-292308 (Literature 5), Japanese Patent Application Laid-Open No. 2003-292309 (Literature 6), Japanese Patent Application Laid-Open No, 2004-063386 (Literature 7), and Japanese Patent Application Laid-Open No. 2007-087841 (Literature 8)).

As a method for improving the capacity and rate characteristic of a lithium-ion secondary battery, Japanese Patent Application Laid-Open No. 2004-303527 (Literature 9) discloses a method using an electrode active material for a non-aqueous electrolytic secondary battery, which is a lithium-vanadium-phosphorus mixed compound powder having an orthorhombic $LiVOPO_4$ crystal structure.

As a method for improving the cycle characteristic of a lithium-ion secondary battery, Japanese Patent Application Laid-Open No. 2001-68304 (Literature 10) discloses a method using an electrode active material for a nonaqueous electrolytic secondary battery, which is constituted by a vanadium-phosphorus mixed compound having a ω-$VOPO_4$ crystal structure.

As a method for improving the initial capacity and discharge rate characteristic of a positive electrode of a lithium secondary battery, Japanese Patent Application Laid-Open No. 2003-173777 (Literature 11) discloses a method of combining a positive electrode active material for a nonaqueous lithium secondary battery with a conductive auxiliary characterized by firing a mixture of a transition metal compound and a lithium compound and combining thus obtained positive electrode active material with the conductive auxiliary by using a spray dryer.

SUMMARY OF THE INVENTION

Even when the polyanionic compound and carbon are combined together by the methods illustrated in the above-mentioned Literatures 1 to 8, however, the particle size of carbon is so much larger than that of a particle made of the polyanionic compound, whereby the particle made of the polyanionic compound may not fully be covered with carbon, or a sufficient contact area may not be secured between the particle made of the polyanionic compound and carbon. Therefore, the electronic conductivity of the polyanionic compound may not fully be enhanced, whereby a lithium-ion secondary battery using the polyanionic compound as the positive electrode active material may still fail to yield a sufficient capacity and rate characteristic.

On the other hand, the inventors have found that, since a mixture of the synthesized polyanionic compound with a conductive auxiliary such as carbon is used as an active material in the methods illustrated in the above-mentioned Literatures 9 to 11, the polyanionic compound and the conductive auxiliary are not fully or closely in contact with each other, whereby the electronic conductivity of the active material fails to improve sufficiently, so do the capacity and rate characteristic of the lithium-ion secondary battery.

In view of the problems of the prior art mentioned above, it is an object of the present invention to provide an active material which can form an electrochemical device excellent in its discharge capacity and rate characteristic, and a method of manufacturing the active material.

For achieving the above-mentioned object, the active material in accordance with a first aspect of the present invention comprises a compound particle containing a compound represented by the following chemical formula (1), a carbon layer covering the compound particle, and a carbon particle:

$$Li_aMXO_4 \qquad (1)$$

where a satisfies 0.9≤a≤2, M denotes one species selected from the group consisting of Fe, Mn, Co, Ni, and VO, and X denotes one species selected from the group consisting of P, Si, S, V, and Ti. In the following, the first aspect of the present invention will be referred to as first aspect.

In the active material in accordance with the first aspect, the surface of the compound particle is covered with the carbon layer having a high electronic conductivity, so as to secure a contact area between the compound particle and carbon layer, whereby the electronic conductivity of the compound particle surface, the electronic conductivity between compound particles, and the electronic conductivity between the compound particle and carbon particle improve, thus enhancing the electronic conductivity of the active material as a whole. An electrochemical device using such an active material as an electrode material can improve the discharge capacity and rate characteristic.

Preferably, in the first aspect, a, M, and X are 1, VO, and P, respectively. That is, the compound particle preferably contains $LiVOPO_4$ in the first aspect. This makes it easier to attain advantageous effects of the first aspect.

Preferably, in the first aspect, the compound particle is a primary particle. The contact area between the compound particle and carbon layer becomes greater when the compound particle that is the primary particle is covered with the carbon layer than when an aggregate (secondary particle) of primary particles is covered with the carbon layer. Therefore, an electrochemical device using such an active material as an electrode material can further improve the discharge capacity and rate characteristic.

Preferably, in the first aspect, the carbon layer has an average thickness of 1 to 30 nm. This makes it easier to attain the advantageous effects of the first aspect. When the carbon layer is too thin, the electronic conductivity of the active material is harder to improve, whereby the advantageous effects of the first aspect tend to become smaller. When the carbon layer is too thick, the occlusion of Li ions into the compound particle and the release of Li ions from the compound particle are easier to be inhibited by the carbon layer, whereby the advantageous effects of the first aspect tend to become smaller.

Preferably, in the first aspect, the carbon particle has an average primary particle size of 10 to 100 nm. This makes it easier to attain the advantageous effects of the first aspect. When the average particle size of the carbon particle is too small, the electronic conductivity of the active material is harder to improve, so that the advantageous effects of the first aspect tend to become smaller. When the average particle size of the carbon particle is too large, the active material contains an excessive ratio of a carbon component, so that the ratio of the compound particle decreases, whereby the advantageous effects of the first aspect tend to become smaller.

Preferably, in the first aspect, the compound particle is carried by a surface of the carbon particle. This reliably brings the compound particle and carbon particle into contact with each other, so as to further improve the electronic conductivity therebetween, whereby the electronic conductivity of the active material as a whole further improves. An electrochemical device using such an active material as an electrode material can further improve the discharge capacity and rate characteristic.

A method of manufacturing the active material in accordance with the first aspect comprises a hydrothermal synthesizing step of heating a mixture including a lithium compound, a first compound containing one species selected from the group consisting of Fe, Mn, Co, Ni, and V, a second compound containing one species selected from the group consisting of P, Si, S, V, and Ti, an organic compound, a carbon particle, and water under pressure; and a firing step of firing the mixture after the heating under pressure in the hydrothermal synthesizing step.

In the method of manufacturing the active material in accordance with the first aspect, a compound particle formed by the lithium, first, and second compounds is covered with carbon derived from the organic compound, whereby a carbon layer is formed on the compound particle surface, which makes it possible to yield the active material in accordance with the first aspect. Since the compound particle generated through the hydrothermal synthesizing and firing steps is covered with carbon derived from the organic compound in the method of manufacturing the active material in accordance with the first aspect, the compound particle is restrained from growing grains in excess, whereby a fine compound particle having a nm-scale particle size can be formed. Thus finely dividing the compound particle increases the specific surface area of the compound particle, thereby improving the lithium diffusing capability of the compound particle and the rate characteristic of the electrochemical device.

Preferably, in the method of manufacturing the active material in accordance with the first aspect, the first compound is $V_2O_5$, while the second compound is a phosphoric acid or phosphate. This makes it possible to form a compound particle containing a compound having a composition represented by $LiVOPO_4$.

Preferably, in the method of manufacturing the active material in accordance with the first aspect, the organic compound is an organic acid or alcohol. This makes it possible for the surface of the compound particle to be covered reliably with the carbon layer.

Preferably, in the method of manufacturing the active material in accordance with the first aspect, the organic acid is ascorbic acid. That is, in the method of manufacturing the active material in accordance with the first aspect, the organic compound is preferably ascorbic acid. This makes it possible for the surface of the compound particle to be covered more reliably with the carbon layer. Using ascorbic acid can reduce the thickness of the carbon layer to about several nm.

Preferably, in the method of manufacturing the active material in accordance with the first aspect, the carbon particle is carbon black. This makes it easier to form the active material in accordance with the first aspect.

Preferably, in the method of manufacturing the active material in accordance with the first aspect, the lithium compound is $LiOH \cdot H_2O$. This makes it easier to form the active material in accordance with the first aspect.

For achieving the above-mentioned object, the active material in accordance with a second aspect of the present invention comprises a carbon particle and a compound particle having an average primary particle size of 0.03 to 1.4 μm, being carried by the carbon particle, and containing a compound represented by the following chemical formula (1):

$$Li_aMXO_4 \tag{1}$$

Where a satisfies 0.9≤a≤2, M denotes one species selected from the group consisting of Fe, Mn, Co, Ni, and VO, and X denotes one species selected from the group consisting of P, Si, S, V, and Ti. In the following, the second aspect of the present invention will be referred to as second aspect.

In the active material in accordance with the second aspect, the compound particle is smaller than conventional active material particles, so that the carbon particle and the compound particle carried by the carbon particle are closely joined together in a nanoscale, while the specific surface area of the compound particle becomes greater, thereby increasing the contact area between the compound particle and carbon particle. Therefore, as compared with the conventional active materials, the active material in accordance with the second aspect enhances the density of electron conduction paths (conduction paths), thereby improving the electric conductivity of the active material. Since the specific surface area of the compound particle becomes greater than that of the conventional active material particles, the ion diffusing capability of the compound particle also improves in the second aspect. An electrochemical device using such an active material as an electrode material can improve the discharge capacity and rate characteristic.

Preferably, in the second aspect, the average primary particle size of the carbon particle is 0.01 to 1 μm. This makes it easier to attain advantageous effects of the second aspect. When the average primary particle size of the carbon particle is too small, the specific surface area of the active material tends to become greater, thereby lowering the bonding force between the active material and current collector or causing an excessive decomposition reaction in the electrolytic solution. When the average primary particle size of the carbon particle is too large, the electronic conductivity of the active material tends to decrease. These tendencies can be suppressed when the average primary particle size of the carbon particle falls within the above-mentioned range.

Preferably, in the second aspect, a, M, and X are 1, VO, and P, respectively. That is, the compound particle preferably contains $LiVOPO_4$ in the second aspect. This makes it easier to attain advantageous effects of the second aspect.

A method of manufacturing the active material in accordance with the second aspect comprises a hydrothermal synthesizing step of heating a mixture including a lithium compound, a first compound containing one species selected from the group consisting of Fe, Mn, Co, Ni, and V, a second compound containing one species selected from the group consisting of P, Si, S, V, and Ti, a carbon particle, and water under pressure; and a firing step of firing the mixture after the heating under pressure in the hydrothermal synthesizing step.

The method of manufacturing the active material in accordance with the second aspect can yield the active material in accordance with, the second aspect. That is, by heating a mixture including not only the lithium, first, and second compounds that are materials for the compound particle, but also the carbon particle under pressure and further firing the mixture, the method of manufacturing the active material in accordance with the second aspect can generate a fine carbon particle (e.g., a fine crystal of $Li_aMXO_4$) having an average primary particle size of 0.03 to 1.4 μm on the carbon particle surface.

Preferably, in the method of manufacturing the active material in accordance with, the second aspect, the first compound is $V_2O_5$, while the second compound is a phosphoric acid or phosphate. This makes it possible to form a compound particle containing a compound having a composition represented by $LiVOPO_4$.

Preferably, in the method of manufacturing the active material in accordance with the second aspect, the carbon particle is activated carbon or carbon black. This makes it easier to form the active material in accordance with this aspect. In the second aspect, carbon black is a submicron fine particle made of at least 95% by volume of amorphous carbon. A specific example of carbon black is acetylene black obtained by thermally decomposing an acetylene gas.

Preferably, in the method of manufacturing the active material in accordance with the second aspect, the lithium compound is $LiOH \cdot H_2O$. This makes it easier to form the active material in accordance with the second aspect.

The first and second aspects can provide active materials which can form electrochemical devices excellent in their discharge capacity and rate characteristic, and methods of manufacturing the active materials.

DESCRIPTION OF THE PREFERRED EMBODIMENTS

Preferred Embodiment of First Aspect

In the following, a preferred embodiment of the first aspect will be explained in detail with reference to the drawings. In the drawings, the same or equivalent parts will be referred to with the same signs, while omitting their overlapping descriptions. Positional relationships such as upper, lower, left, and right will be based on those depicted unless otherwise specified. Dimensions and ratios in the drawings are not limited to those depicted. In the following, the preferred embodiment of the first aspect will be referred to as first embodiment.

Active Material

Figure 1:
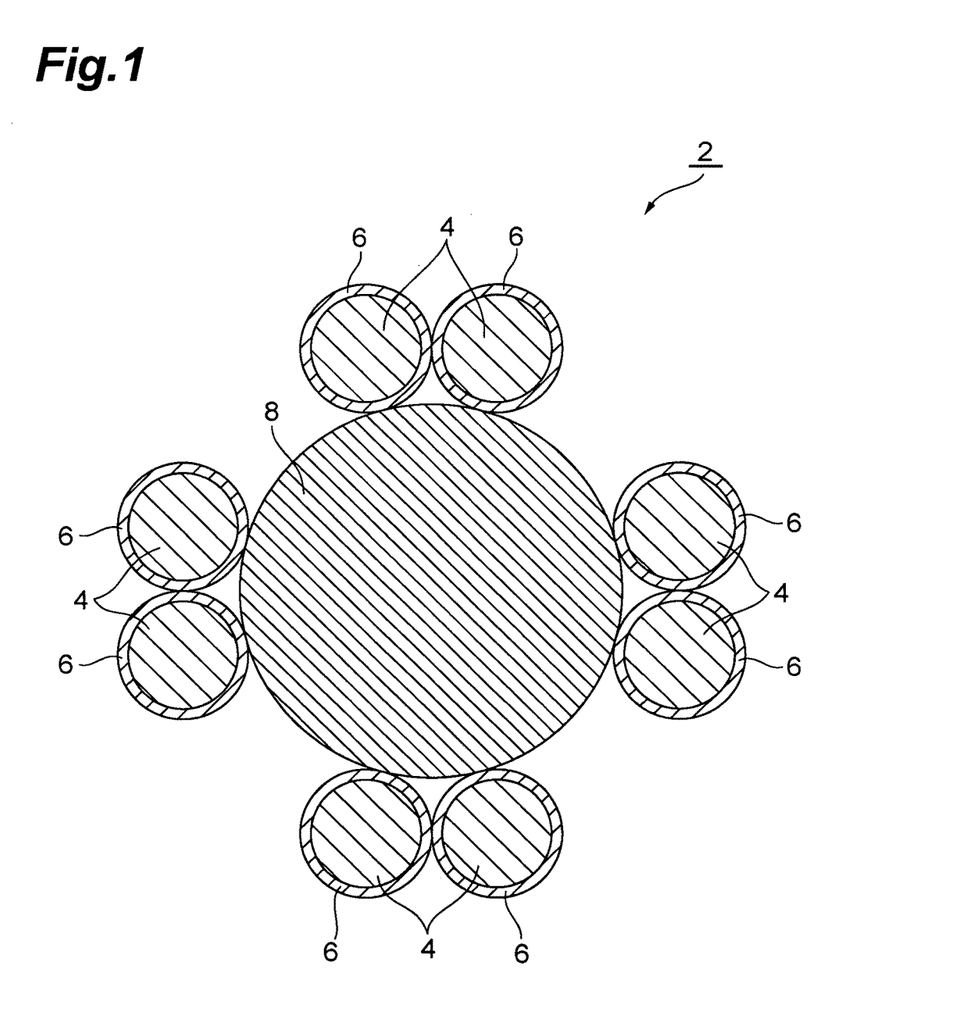
FIG. 1 is a schematic sectional view illustrating an example of the active material of the first aspect.

As illustrated in FIG. 1, the active material 2 of the first embodiment comprises compound particles 4, carbon layers 6 covering the compound particles 4, and a carbon particle 8.

In the first embodiment, the compound particles 4 are carried by the surface of the carbon particle 8. This reliably brings each compound particle 4 and the carbon particle 8 into contact with each other, thereby further improving the electronic conductivity therebetween and the electronic conductivity of the active material 2 as a whole. An electrochemical device using such active material 2 as an electrode material can further improve its discharge capacity and rate characteristic. The compound particles 4 may be carried by the whole surface of the carbon particle 8, so that the whole surface of the carbon particle 8 is covered with the compound particles 4, or by a part of the surface of the carbon particle 8.

Compound Particle 4

The compound particles 4 are constituted by a compound having a composition represented by the following chemical formula (1):

$$Li_aMXO_4 \quad (1)$$

where a satisfies 0.9≤a≤2, M denotes one species selected from the group consisting of Fe, Mn, Co, Ni, and VO, and X denotes one species selected from the group consisting of P, Si, S, V, and Ti.

Specific materials represented by the above-mentioned chemical formula (1) include lithium-containing phosphates such as $LiFePO_4$, $LiMnPO_4$, $LiCoPO_4$, $LiNiPO_4$, and $LiVOPO_4$; lithium-containing silicates such as $Li_2FeSiO_4$, $Li_2MnSiO_4$, $Li_2CoSiO_4$, and $Li_2VOSiO_4$; and lithium-containing compounds such as $Li_2FeTiO_4$, $Li_2MnTiO_4$, $LiFeSO_4$, $LiMnSO_4$, and $LiV_2O_5$. These materials allow occlusion and release of lithium ions, desorption and insertion (intercalation) of lithium ions, or doping and undoping of lithium ions and their counteranions (e.g., $PF_6^-$) to proceed reversibly.

Preferably, in the above-mentioned chemical formula (1), a, M, and X are 1, VO, and P, respectively. That is, the specific material represented by the above-mentioned chemical formula (1) is preferably constituted by $LiVOPO_4$. This makes it easier to attain the advantageous effects of the first aspect. When the active material of the first aspect using $LiVOPO_4$ is employed as a positive electrode active material of a lithium-ion secondary battery, the lithium-ion secondary battery can be charged and discharged at a higher voltage (about 4.0 V) than when using $LiFePO_4$.

The compound particle 4 is preferably a primary particle. The contact area between the compound particle 4 and carbon layer 6 becomes greater when the compound particle 4 that is a primary particle is covered with the carbon layer 6 than when an aggregate (secondary particle) of primary particles is covered with the carbon layer 6. Therefore, the electronic conductivity of the active material 2 can further be enhanced, whereby the discharge capacity and rate characteristic can further be improved in the electrochemical device using the active material 2 as an electrode material.

Preferably, the compound particles 4 have an average primary particle size of 10 to 500 nm. This increases the specific surface area of the compound particle 4, so that the contact area between the compound particle 4 and carbon layer 6 becomes larger, whereby the electronic conductivity of the active material 2 can further be improved. In the first embodiment, the average particle size of the compound particles 4 is smaller than that of conventional active material particles, so that the Li-ion diffusing capability in the compound particles 4 improves, whereby the advantageous effects of the first aspect are easier to attain. When the average particle size of the compound particles 4 is too small, the capacitance density of an electrode using the active material 2 tends to decrease. When the average particle size of the compound particles 4 is too large, the Li-ion diffusing capability in the compound particles 4 tends to decrease. The average particle size of the compound particles 4 falling within the range mentioned above can suppress these tendencies, whereby the reduction in ion diffusion resistance and the maintenance of the capacitance density of the electrode can be balanced with each other.

Preferably, the compound particle 4 has a spherical form. Specifically, it will be preferred if the compound particle 4 is a sphere constituted by an α-type (triclinic) crystal of $Li_aMXO_4$. This makes it easier to attain the advantageous effects of the first aspect. The thermal stability of the compound particle 4 becomes better when the compound particle 4 is constituted by an α-type (triclinic) crystal of $Li_aMXO_4$ than when the compound particle 4 is constituted by a β-type (orthorhombic) crystal of $Li_aMXO_4$.

Carbon Layer 6

Preferably, the thickness of the carbon layer 6 is 1 to 30 nm. This makes it easier to attain the advantageous effects of the first aspect. When the carbon layer 6 is too thin, the electronic conductivity of the active material 2 is harder to improve, whereby the advantageous effects of the first aspect tend to become smaller. When the carbon layer 6 is too thick, the occlusion of Li ions into the compound particle 4 and the release of Li ions from the compound particles 4 are easier to be inhibited by the carbon layer 6, whereby the advantageous effects of the first aspect tend to become smaller.

Preferably, the whole surface of the compound particle 4 is covered with the carbon layer 6. In this case, the contact area between the compound particle 4 and carbon layer 6 becomes greater than in the case where only a part of the surface of the compound particle 4 is covered with the carbon layer 6, whereby the electronic conductivity of the active material 2 can be improved. For securing an Li-ion migration path within the active material 2, a part of the surface of the compound particle 4 may be exposed without being covered with the carbon layer 6.

Carbon Particle 8

Examples of the material constituting the carbon particle 8 include carbon black such as acetylene black and ketjen black, graphite, soft carbon, and hard carbon. Among them, carbon black is preferably used. This makes it easier to attain the advantageous effects of the first aspect.

Preferably, the average primary particle size of the carbon particle 8 is 10 to 100 nm. When the average particle size of the carbon particle 8 is too small, the electronic conductivity of the active material 2 is harder to improve, whereby the advantageous effects of the first aspect tend to become smaller. When the average particle size of the carbon particle 8 is too large, the active material 2 contains an excessive ratio of a carbon component, so that the ratio of the compound particles 4 decreases, whereby the advantageous effects of the first aspect tend to become smaller. The carbon particle 8 may be either a primary or secondary particle.

In the active material 2 in accordance with the first embodiment, since the surface of the compound particle 4 is covered with the carbon layer 6 having a high electronic conductivity, a contact area is secured between the compound particle 4 and carbon layer 6, so as to enhance the electronic conductivity of the surface of the compound particle 4, the electronic conductivity between the compound particles 4, and the electronic conductivity between the compound particle 4 and carbon particle 8, whereby the electronic conductivity of the active material 2 as a whole improves.

The active material 2 of the first embodiment can be used as an electrode material in an electrochemical device such as a lithium-ion secondary battery. More specifically, in a lithium-ion secondary battery comprising a negative electrode (anode), a positive electrode (cathode), and an ionically conductive electrolytic layer, in which the negative and positive electrodes oppose each other through the electrolytic layer interposed therebetween, the active material 2 of the first embodiment is contained in an active material layer of at least one of the negative and positive electrodes, for example. This can improve the discharge capacity and rate characteristic of the lithium-ion secondary battery. The active material 2 of the first embodiment is suitable as a positive electrode active material in particular.

Method of Manufacturing Active Material 2

The above-mentioned active material 2 of the first embodiment can be manufactured by the following manufacturing method.

The method of manufacturing the active material in accordance with the first embodiment comprises a hydrothermal synthesizing step of heating a mixture including a lithium compound, a first compound containing one species selected from the group consisting of Fe, Mn, Co, Ni, and V, a second compound containing one species selected from the group consisting of P, Si, S, V, and Ti, an organic compound, a carbon particle, and water under pressure; and a firing step of firing the mixture after the heating under pressure in the hydrothermal synthesizing step.

Materials for the Active Material 2

Examples of the lithium compound include $Li_2CO_3$, $LiOH.H_2O$, and lithium acetate, among which $LiOH.H_2O$ is preferably used in particular. This makes it easier to form the active material 2. Using $LiOH.H_2O$ can also reduce impurities in the resulting compound particles 4, whereby the capacitance density of the active material 2 can be increased. Further, the use of $LiOH.H_2O$ can adjust the pH of the mixture (aqueous solution to be explained later).

Examples of the first compound include $FeC_2O_4$, $FeCl_2$, $FeSO_4$, $Fe(NO_3)_2$, $Fe(NO_3)_3$, $FeCl_3$, $MnCl_2$, $CoCl_2$, $NiCl_2$, $V_2O_5$, and $NH_4VO_3$.

Examples of the second compound include $NH_4H_2PO_4$, $(NH_4)_2HPO_4$, $Li_2SiO_3$, $Li_2SO_4$, $V_2O_5$, $NH_4VO_3$, $TiO_2$, and tetraisopropoxytitanium.

Preferably, in the first embodiment, the first compound is $V_2O_5$, while the second compound is a phosphoric acid or a phosphate such as $NH_4H_2PO_4$ or $(NH_4)_2HPO_4$. This makes it possible to form the compound particles 4 made of a compound having a composition represented by $LiVOPO_4$.

Preferably, the organic compound is an organic acid or alcohol. This makes it possible for the surface of the compound particle 4 to be covered reliably with the carbon layer 6. Specific examples of the organic acid include ascorbic acid, citric acid, maleic acid, fumaric acid, glucose, and polysaccharides and oligosaccharides containing glucose as their constitutional unit. Specific examples of the alcohol include methanol, ethanol, glycol, and glycerin.

Preferably, in the first embodiment, the organic acid is ascorbic acid. This makes it possible to cover the surface of the compound particle 4 with the carbon layer 6 more reliably and reduce the thickness of the carbon layer 6 to about 1 to 10 nm. When ascorbic acid is used, the compound particles 4 are covered with carbon derived from ascorbic acid or a compound containing such carbon as the compound particles 4 grow grains in the process of manufacturing the active material 2, whereby the compound particles 4 can be restrained from growing grains in excess. As a result, the fine compound particles 4 having an average particle size on the order of 10 to 500 DM can be formed. If the carbon layer 6 is to be formed from a carbon material such as carbon black, i.e., the compound particles 4 are to be covered with carbon particles made of carbon black or the like, the particle size of the carbon particles will be too large, thus making it difficult for the compound particles 4 to be covered with the carbon particles, while the carbon layer 6 will be hard to reduce its thickness to about 1 to 10 nm. If the compound particles 4 are to be covered with carbon particles made of carbon black or the like, the compound particles 4 cannot fully be restrained from growing grains in excess, whereby the fine compound particles 4 will be hard to form.

Specific examples of the carbon particles include carbon black such as acetylene black and ketjen black, graphite, soft carbon, hard carbon, and activated carbon. Among them, carbon black is preferably used. This makes it easier to form the active material 2. Using carbon black makes it possible to disperse the carbon particles uniformly in the above-mentioned mixture (aqueous solution to be explained later) at the time of hydrothermal synthesis.

Hydrothermal Synthesizing Step

First, in the hydrothermal synthesizing step, the above-mentioned lithium compound, first compound, second compound, organic compound, carbon particle, and water are put into a reaction container (e.g., autoclave) which is adapted to heat and pressurize the inside, so as to prepare a mixture (aqueous solution) in which they are dispersed. The mixture may also be prepared, for example, by refluxing a mixture of the first compound, second compound, and water at first and then adding the lithium compound, organic compound, and carbon particle thereto. The reflux can form a complex of the first and second compounds.

Compounding ratios of the lithium, first, and second compounds in the mixture may be adjusted such that the compound particles 4 in the resulting active material 2 attain the composition represented by the above-mentioned chemical formula (1).

Preferably, the organic compound content in the mixture is adjusted such that the number of moles C1 of carbon atoms constituting the organic compound and the number of moles M of metal elements contained in the first compound have a ratio C1/M satisfying 0.1≤C1/M≤10. When the organic compound content (number of moles C1) is too small, the electronic conductivity of the active material 2 tends to decrease. When the organic compound content is too large, the weight of the compound particles 4 in the active material 2 tends to decrease relatively, thereby lowering the capacitance density of the active material 2. The organic compound content falling within the above-mentioned range can suppress these tendencies.

Preferably, the carbon particle content in the mixture is adjusted such that the number of moles C2 of carbon atoms constituting the carbon particle and the number of moles M of metal elements contained in the first compound have a ratio C2/M satisfying 0.05≤C2/M≤1. When the carbon particle content (number of moles C2) is too small, the electronic conductivity and capacitance density tend to decrease in the active material 2. When the carbon particle content is too large, the weight of the compound particles 4 in the active material 2 tends to decrease relatively, thereby lowering the capacitance density of the active material 2. The carbon particle content falling within the above-mentioned range can suppress these tendencies.

Subsequently, the reaction container is hermetically closed, and the mixture is heated under pressure, so that a hydrothermal reaction proceeds in the mixture. This yields a precursor of the active material 2. In the precursor, a compound having a composition represented by the following chemical formula (1) and constituting the compound particles 4 in the active material 2 is hydrothermally synthesized:

$$Li_aMXO_4 \quad (1)$$

where a satisfies 0.9≤a≤2, M denotes one species selected from the group consisting of Fe, Mn, Co, Ni, and VO, and X denotes one species selected from the group consisting of P, Si, S, V, and Ti.

The precursor of the active material 2 is a tar-like material. The inventors consider that the precursor is an amorphous material, since no remarkable x-ray peak is observed when the precursor is analyzed by an x-ray diffraction method.

Preferably, the pressure applied to the mixture in the hydrothermal synthesizing step is 0.2 to 1 MPa. When the pressure is too low, the crystallinity of the generated compound particles 4 tends to decrease, thereby lowering the capacitance density of the active material 2. When the pressure is too high, the reaction container tends to require a higher pressure resistance, thereby increasing the cost for manufacturing the active material 2. The pressure falling within the above-mentioned range can suppress these tendencies.

Preferably, the temperature of the mixture in the hydrothermal synthesizing step is 150 to 200° C. When the temperature is too low, the crystallinity of the generated compound particles 4 tends to decrease, thereby lowering the capacitance density of the active material 2. When the temperature is too high, the reaction container tends to require a higher pressure resistance, thereby increasing the cost for manufacturing the active material 2. The temperature falling within the above-mentioned range can suppress these tendencies.

Firing Step

In the firing step, the mixture (precursor of the active material 2) after the heating under pressure in the hydrothermal synthesizing step is fired. This yields the active material 2 in accordance with the first embodiment.

Preferably, the firing temperature of the mixture in the firing step is 400 to 700° C. When the firing temperature is too low, the compound particles 4 tend to grow insufficiently, thereby lowering the capacitance density of the active material 2. When the firing temperature is too high, the compound particles 4 tend to advance grain growth and increase their particle size, thereby retarding the diffusion of lithium in the active material 2 and lowering the capacitance density of the active material 2. The firing temperature falling within the above-mentioned range can suppress these tendencies.

Preferably, the fixing time for the mixture is 3 to 20 hr. Preferably, the firing atmosphere for the mixture is a nitrogen atmosphere, argon atmosphere, or air atmosphere.

The tar-like mixture obtained by the hydrothermal synthesizing step may be heat-treated at about 60 to 150° C. for about 1 to 30 hr before being fired in the firing step. This heat treatment turns the tar-like mixture into a powder. Thus obtained powdery mixture may be fired. This can remove unnecessary moisture and organic solvent from the mixture, prevent impurities from being taken into crystals of the compound particles 4, and homogenize particle forms of the compound particles 4.

By covering the compound particles 4 formed from the lithium, first, and second compounds with carbon derived from the organic compound, the method of manufacturing the active material 2 in accordance with the first embodiment can form the carbon layer 6 on the surface of each compound particle 4, thereby yielding the active material 2. Since the compound particles 4 generated through the hydrothermal synthesizing step and firing step are covered with carbon derived from the organic compound such as ascorbic acid, the compound particles 4 are restrained from growing grains in excess, whereby the fine compound particles 4 having a particle size on the order of 10 to 500 nm can be formed.

Though a preferred embodiment of the active material in accordance with the first aspect and the method of manufacturing the active material are explained in detail in the foregoing, the first aspect is not limited to the above-mentioned embodiment.

For example, the active material of the first aspect may also be used as an electrode material for an electrochemical device other than lithium-ion secondary batteries. Examples of the electrochemical device include secondary batteries, other than the lithium-ion secondary batteries, such as metal lithium secondary batteries (using an electrode containing the active material of the first aspect as a cathode and metallic lithium as an anode) and electrochemical capacitors such as lithium capacitors. These electrochemical devices can be used for power supplies for self-propelled micromachines and IC cards, and decentralized power supplies placed on or within printed boards.

Examples of First Aspect

The first aspect will now be explained more specifically with reference to Examples 1 to 4 and Comparative Examples 1 and 2, which do not restrict the first aspect.

Example 1

Hydrothermal Synthesizing Step

An aqueous $H_3PO_4$ solution prepared by dissolving 23.08 g of $H_3PO_4$ into 500 g of water was put into a 1.5-L, autoclave container, and then 1837 g of $V_2O_5$ were gradually added into the container. After completely adding $V_2O_5$, the container was hermetically closed, and the mixture was refluxed for 16 hr at 95° C./200 rpm. After the reflux, the container was once opened when the content in the container was cooled to room temperature. After adding 8.48 g of $LiOH.H_2O$ and 7.13 g of ascorbic acid ($C_6H_8O_6$) into the container, 1.0 g of carbon black was added thereto. Then, the container was closed again, the pressure within the container was set to 0.5 MPa, and the content was held for 8 hr while refluxing at 160° C./300 rpm. This yielded a tar-like mixture (active material precursor).

Subsequently, the tar-like mixture obtained by the hydrothermal synthesizing step was heat-treated for about 23 hr at 90° C. with an oven and then pulverized, so as to yield a gray powder.

Firing Step

Thus obtained powder was put into an alumina crucible, heated for 4 hr at 450° C., and then rapidly cooled. The powder was fired in an air atmosphere. In the firing step, the firing temperature was raised from room temperature to 450° C. in 45 min. The firing step yielded a brownish-red powder (active material of Example 1). The result of powder x-ray diffraction showed that the obtained brownish-red powder contained $\alpha LiVOPO_4$ ($\alpha$-type crystals of $LiVOPO_4$).

Figure 2:
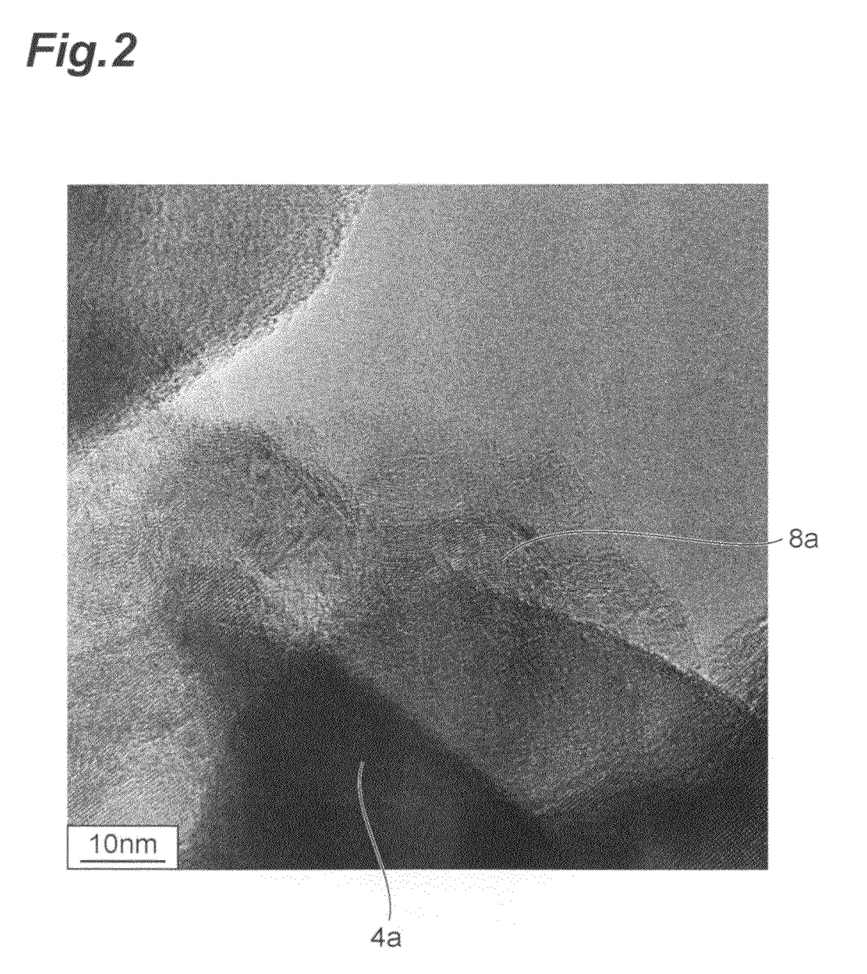
FIG. 2 is a TEM image of the active material in Example 1 of the first aspect.

Next, the obtained brownish-red powder was observed through a TEM (transmission electron microscope). FIG. 2 illustrates an image of the brownish-red powder photographed through the TEM. As illustrated in FIG. 2, the brownish-red powder was seen to contain a carbon particle 8a having a laminar structure of carbon and a compound particle 4a constituted by $\alpha LiVOPO_4$ and carried by the carbon particle 8a.

Figure 3:
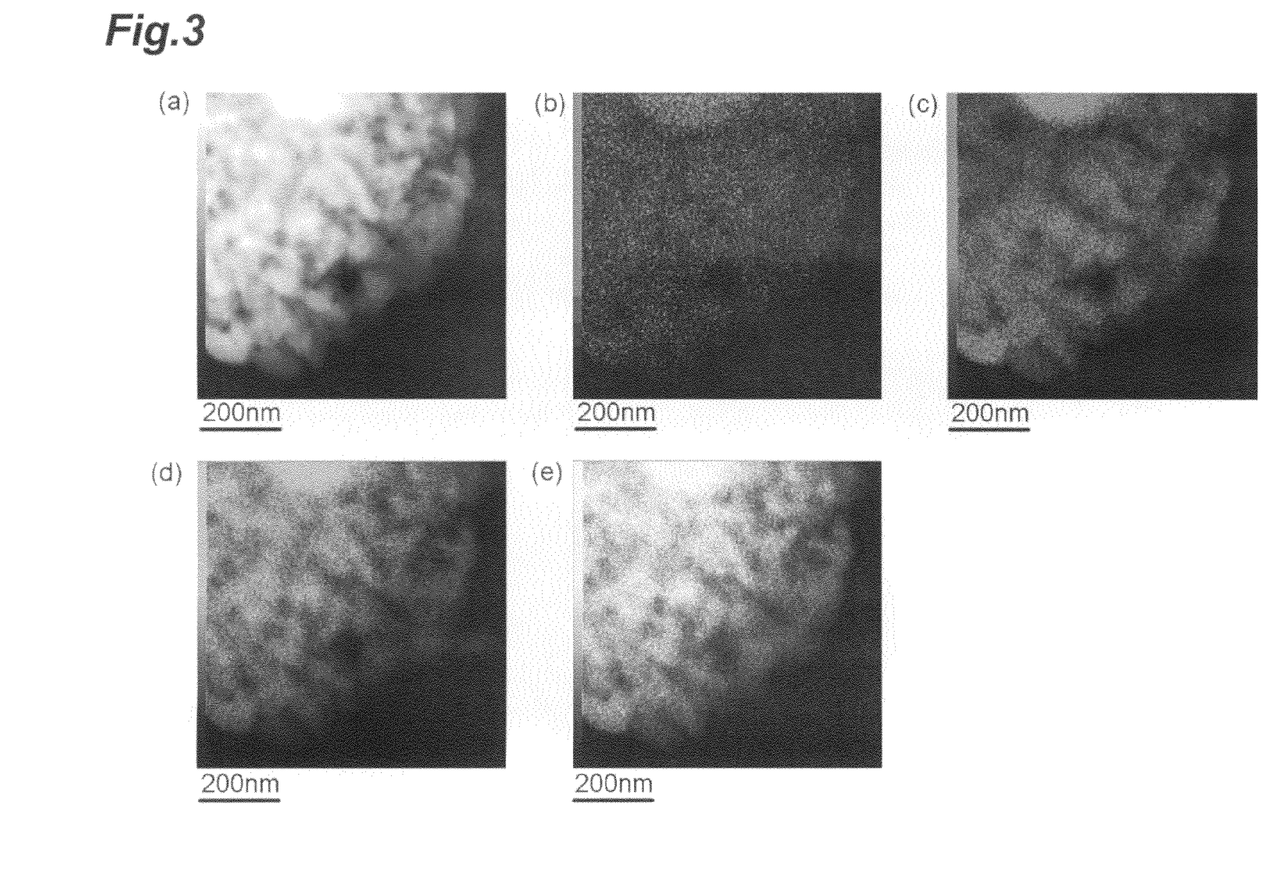
FIG. 3 is an element distribution map based on TEM-EDS of the active material in Example 1 of the first aspect.

Next, the composition of the brownish-red powder was analyzed by TEM-EDS (energy-dispersive x-ray spectroscopy). FIGS. 3(*a*) to 3(*e*) illustrate the results. FIG. 3(*a*) is a dark-field (ADF) image of the brownish-red powder, while FIGS. 3(*b*), 3(*c*), 3(*d*), and 3(*e*) are element distribution maps for carbon (C), oxygen (O), phosphorus (P), and vanadium (V), respectively. In FIGS. 3(*b*), 3(*c*), 3(*d*), and 3(*e*), white highlighted parts are positions where K-lines emitted from the respective elements were observed and indicate where the respective elements existed.

It was seen from FIGS. 2 and 3(*a*) that a plurality of compound particles 4a constituted by $\alpha LiVOPO_4$ were carried by the carbon particle 8a and covered the surface of the carbon particle 8a in the brownish-red powder. It was also seen from FIG. 3(*b*) that the surface of the compound particle 4a carried by the carbon particle 8a was covered with a carbon layer.

Making of an Evaluation Cell

The active material of Example 1 and a mixture of polyvinylidene fluoride (PVDF) and acetylene black as a binder were dispersed in N-methyl-2-pyrrolidone (NMP) serving as a solvent, so as to prepare a slurry. Here, the slurry was prepared such that the weight ratio of the active material, acetylene black, and PVDF became 84:8:8 therein. The slurry was applied onto an aluminum foil serving as a current collector, dried, and then extended by press, so as to yield an electrode (positive electrode) formed with an active material containing layer containing the active material of Example 1.

Subsequently, thus obtained electrode and an Li foil as its counter electrode were laminated while interposing therebetween a separator made of a macroporous polyethylene film, so as to yield a multilayer body (matrix). This multilayer body was put into an aluminum laminator pack, a 1-M $LiPF_6$ solution was injected thereinto as an electrolytic solution, and then the pack was sealed under vacuum, so as to make an evaluation cell of Example 1.

Example 2

Hydrothermal Synthesizing Step

An Aqueous $Li_3PO_4$ Solution Prepared by Dissolving 23.16 g of $Li_3PO_4$ into 750 g of water was put into a autoclave container, and then 25.35 g of $FeCl_2$ were added into the container. After adding 7.1 g of ascorbic acid thereto, 1.0 g of carbon black was further added. Subsequently, the container was hermetically closed again, the pressure within the container was set to 0.5 MPa, and the content was held for 48 hr while refluxing at 160° C./300 rpm. This yielded a tar-like mixture (active material precursor).

Subsequently, the tar-like mixture obtained by the hydrothermal synthesizing step was heat-treated for about 23 hr at 90° C. with an oven and then pulverized, so as to yield a gray powder.

Firing Step

Thus obtained powder was put into an alumina crucible, heated for 12 hr at 500° C., and then rapidly cooled. The powder was fired in an air atmosphere. In the firing step, the firing temperature was raised from room temperature to 500° C. in 50 min, The firing step yielded an active material of Example 2 (black powder). The result of powder x-ray diffraction showed that the obtained black powder contained $LiFePO_4$.

Subsequently, thus obtained black powder was observed through the TEM as in Example 1. The TEM observation showed that thus obtained black powder contained a carbon particle exhibiting a laminar structure of carbon and a compound particle constituted by $LiFePO_4$ and carried by the carbon particle.

Also, the composition of the black powder was analyzed by TEM-EDS (energy-dispersive x-ray spectroscopy) as in Example 1. As a result, it was seen that a plurality of compound particles constituted by $LiFePO_4$ were carried by the carbon particle and covered the carbon particle in the black powder. It was also seen that the surface of the compound particle carried by the carbon particle was covered with a carbon layer.

Next, an evaluation cell equipped with a positive electrode formed with an active material containing layer containing the active material of Example 2 was made by the same method as that of Example 1.

Example 3

An active material of Example 3 was synthesized by the same method as that of Example 1 except that the temperature of the content after adding carbon black was 180° C. in the hydrothermal synthesizing step.

Subsequently, the active material of Example 3 was observed through the TEM as in Example 1. The TEM observation showed that the active material of Example 3 contained a carbon particle exhibiting a laminar structure of carbon and a compound particle constituted by $\alpha LiVOPO_4$ and carried by the carbon particle.

Also, the composition of the active material of Example 3 was analyzed by TEM-EDS as in Example 1. As a result, it was seen that a plurality of compound particles constituted by $\alpha LiVOPO_4$ were carried by the carbon particle and covered the carbon particle in the active material of Example 3. It was also seen that the surface of the compound particle carried by the carbon particle was covered with a carbon layer.

Next, an evaluation cell equipped with a positive electrode formed with an active material containing layer containing the active material of Example 3 was made.

Example 4

An active material of Example 4 was synthesized by the same method as that of Example 1 except that the temperature of the content after adding carbon black was 150° C. in the hydrothermal synthesizing step.

Subsequently, the active material of Example 4 was observed through the TEM as in Example 1. The TEM observation showed that the active material of Example 4 contained a carbon particle exhibiting a laminar structure of carbon and a compound particle constituted by $\alpha LiVOPO_4$ and carried by the carbon particle.

Also, the composition of the active material of Example 4 was analyzed by TEM-EDS as in Example 1. As a result, it was seen that a plurality of compound particles constituted by $\alpha LiVOPO_4$ were carried by the carbon particle and covered the carbon particle in the active material of Example 4. It was also seen that the surface of the compound particle carried by the carbon particle was covered with a carbon layer.

Next, an evaluation cell equipped with a positive electrode formed with an active material containing layer containing the active material of Example 4 was made.

Comparative Example 1

Water was evaporated from a solution in which $LiNO_3$, $V_2O_5$, and $H_3PO_4$ had been dissolved at a molar ratio of 2:1:2 in water, so as to dry the dissolved matter. The dried matter was further dried for one night, pulverized, and then fired at 700° C., so as to yield an active material of Comparative Example 1. The result of powder x-ray diffraction showed that the active material of Comparative Example 1 contained $\alpha LiVOPO_4$ ($\alpha$-type crystals of $LiVOPO_4$).

Subsequently, the active material of Comparative Example 1 was analyzed by the TEM and TEM-EDS as in Example 1. As a result, it was seen that no compound particles constituted by $\alpha LiVOPO_4$ were covered with a carbon layer in the active material of Comparative Example 1.

Next, an evaluation cell equipped with a positive electrode formed with an active material containing layer containing the active material of Comparative Example 1 was made by the same method as that of Example 1.

Comparative Example 2

An active material (brownish-red powder) of Comparative Example 2 was obtained by the same method as that of Example 1 except that ascorbic acid was not used. The result of powder x-ray diffraction showed that the active material of Comparative Example 2 contained $\alpha LiVOPO_4$ ($\alpha$-type crystals of $LiVOPO_4$).

Subsequently, the active material of Comparative Example 2 was analyzed by the TEM and TEM-EDS as in Example 1. As a result, it was seen that no compound particles constituted by $\alpha LiVOPO_4$ were covered with a carbon layer in the active material of Comparative Example 2.

Next, an evaluation cell equipped with a positive electrode formed with an active material containing layer containing the active material of Comparative Example 2 was made by the same method as that of Example 1.

Measurement of Discharge Capacity and Rate Characteristic

For each of the evaluation cells of Examples 1 to 4 and Comparative Examples 1 and 2, the discharge capacity (unit: mAh/g) at a discharge rate of 0.2 C (the current value at which constant current discharging at 25° C. completes in 5 hr) and the discharge capacity at a discharge rate of 5 C (the current value at which constant current discharging at 25° C. completes in 0.2 hr) were measured. Table 1 lists the discharge capacity at 0.1 C. The ratio (%) of the discharge capacity at 5 C to the discharge capacity at 0.2 C taken as 100% was determined as the rate characteristic. Table 1 lists the results. Here, the higher the discharge capacity and rate characteristic become, the more preferred they are.

TABLE 1

|  | Discharge capacity (mAh/g) | Rate characteristic (%) |
| --- | --- | --- |
| Example 1 | 140 | 71 |
| Example 2 | 152 | 78 |
| Example 3 | 136 | 69 |
| Example 4 | 132 | 65 |
| Comparative Example 1 | 108 | 32 |
| Comparative Example 2 | 116 | 54 |

As listed in Table 1, it was seen that the discharge capacity and rate characteristic were higher in Examples 1 to 4 than in Comparative Examples 1 and 2.

Preferred Embodiment of Second Aspect

In the following, a preferred embodiment of the second aspect will be explained in detail with reference to the drawings. In the drawings, the same or equivalent parts will be referred to with the same signs, while omitting their overlapping descriptions. Positional relationships such as upper, lower, left, and right will be based on those depicted unless otherwise specified. Dimensions and ratios in the drawings are not limited to those depicted. In the following, the preferred embodiment of the second aspect will be referred to as second embodiment.

Active Material

Figure 4:
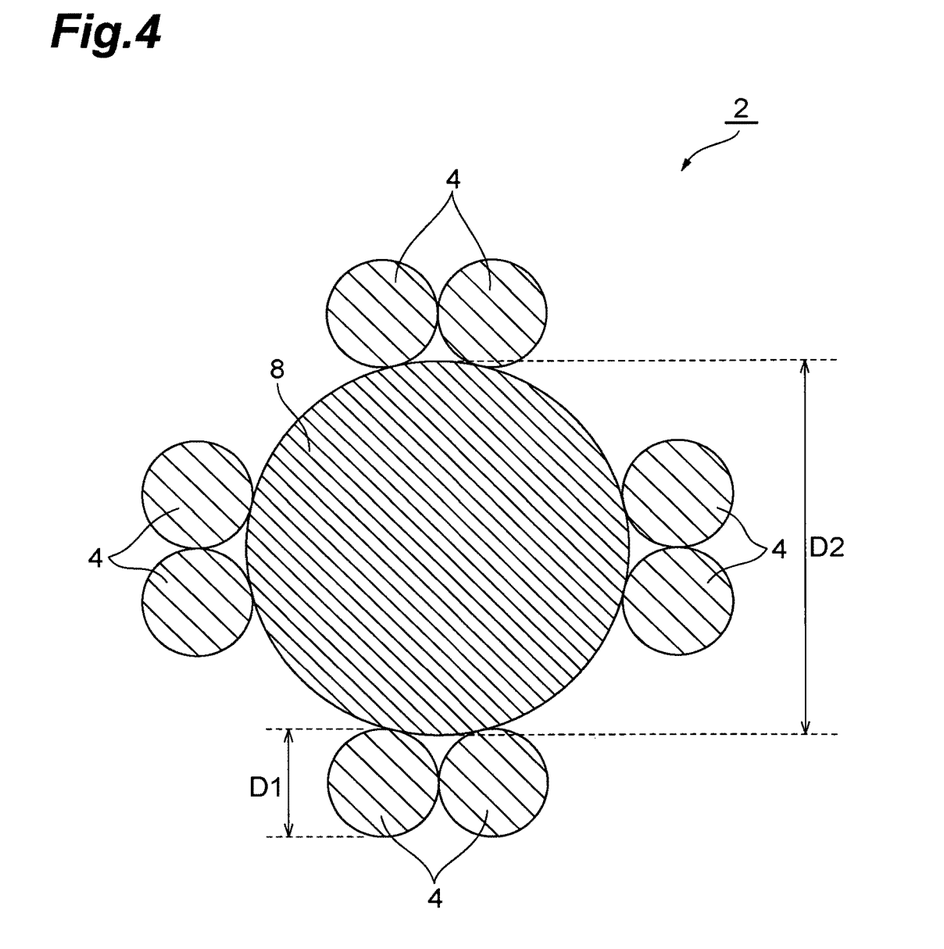
FIG. 4 is a schematic sectional view illustrating an example of the active material of the second aspect.

As illustrated in FIG. 4, the active material 2 of the first embodiment comprises a carbon particle 8 and compound particles 4 carried by the carbon particle 8. The compound particles 4 may be carried by the whole surface of the carbon particle 8, so that the whole surface of the carbon particle 8 is covered with the compound particles 4, or by a part of the surface of the carbon particle 8.

Compound Particle 4

The compound particles 4 are constituted by a compound having a composition represented by the following chemical formula (1):

$$Li_aMXO_4 \qquad (1)$$

where a satisfies $0.9 \le a \le 2$, M denotes one species selected from the group consisting of Fe, Mn, Co, Ni, and VO, and X denotes one species selected from the group consisting of P, Si, S, V, and Ti.

Specific materials represented by the above-mentioned chemical formula (1) include lithium-containing phosphates such as $LiFePO_4$, $LiMnPO_4$, $LiCoPO_4$, $LiNiPO_4$, and $LiVOPO_4$; lithium-containing silicates such as $Li_2FeSiO_4$, $Li_2MnSiO_4$, $Li_2CoSiO_4$, and $Li_2VOSiO_4$; and lithium-containing compounds such as $Li_2FeTiO_4$, $Li_2MnTiO_4$, $LiFeSO_4$, $LiMnSO_4$, and $LiV_2O_5$. These materials allow occlusion and release of lithium ions, desorption and insertion (intercalation) of lithium ions, or doping and undoping of lithium ions and their counteranions (e.g., $PF_6^-$) to proceed reversibly.

Preferably, in the above-mentioned chemical formula (1), a, M, and X are 1, VO, and P; respectively. That is, the specific material represented by the above-mentioned chemical formula (1) is preferably constituted by $LiVOPO_4$. This makes it easier to attain the advantageous effects of the second aspect. When the active material of the second aspect using $LiVOPO_4$ is employed as a positive electrode active material of a lithium-ion secondary battery, the lithium-ion secondary battery can be charged and discharged at a higher voltage (about 4.0 V) than when using $LiFePO_4$.

The compound particles 4 have an average primary particle size D1 of 0.03 to 1.4 μm, preferably 0.05 to 0.8 μm. Here, a plurality of compound particles 4 are observed through an electron microscope such as SEM, the length of the outer circumference of each compound particle 4 is determined, the diameter of each compound particle 4 is calculated by assuming it to be a sphere, and the respective diameters of the compound particles 4 are averaged as the average primary particle size.

The compound particles 4 having an average primary particle size falling within the range mentioned above are smaller than conventional active material particles, and thus have a larger specific surface area and can be distributed on the surface of the carbon particle 8 more densely than the conventional active material particles. This increases the contact area between the compound particle 4 and carbon particle 8. As a result, the density of electron conduction paths (conduction paths) becomes higher in the active material 2 than in the conventional active materials, thereby improving the electric conductivity of the active material 2. Since the specific surface area of the compound particles 4 is greater than that of the conventional active material particles, the ion diffusing capability of the compound particles 4 also improves. An electrochemical device using such active material 2 as an electrode material can improve the discharge capacity and rate characteristic.

When the average primary particle size of the compound particles 4 is too small, the capacitance density of an electrode using the active material 2 tends to decrease. When the average primary particle size of the compound particles 4 is too large, the capacitance density of the electrode or the Li-ion diffusing capability in the compound particles 4 tends to decrease. The average primary particle size of the compound particles 4 falling within the range mentioned above can suppress these tendencies, whereby the reduction in ion diffusion resistance and the maintenance of the capacitance density of the electrode can be balanced with each other.

Preferably, each compound particle 4 is a primary particle. When the compound particles 4 that are primary particles are carried by the carbon particle 8, they can be distributed more densely on the surface of the carbon particle 8 than when they are an aggregate (secondary particle) of primary particles, whereby the electric conductivity of the active material 2 is easier to improve. Therefore, the electric conductivity of the active material 2 can be improved more. When the compound particles 4 aggregate in excess, the electronic conductivity of the active material 2, capacitance density of the electrode, and Li-ion diffusing capability in the compound particles 4 tend to decrease.

Preferably, the compound particle 4 has a spherical form. Specifically, it will be preferred if the compound particle 4 is a sphere constituted by an α-type (triclinic) crystal of $Li_aMXO_4$. This makes it easier to attain the advantageous effects of the second aspect. The thermal stability of the compound particle 4 becomes better when the compound particle 4 is constituted by an α-type (triclinic) crystal of $Li_aMXO_4$ than when the compound particle 4 is constituted by a β-type (orthorhombic) crystal of $Li_aMXO_4$.

Carbon Particle 8

Preferably, the average primary particle size of the carbon particle 8 is 0.01 to 1 μm. This makes it easier to attain the advantageous effects of the second aspect. When the average particle size of the carbon particle 8 is too small, the specific surface area of the active material tends to become greater, thereby lowering the bonding force between the active material and a current collector and causing an excessive decomposition reaction in the electrolytic solution, while the electronic conductivity of the active material 2 tends to be harder to improve, thereby lowering the advantageous effects of the second aspect. When the average primary particle size of the carbon particle is too large, the electronic conductivity of the active material tends to decrease, while the active material 2 contains an excessive ratio of a carbon component, so that the ratio of the compound particles 4 decreases, whereby the advantageous effects of the first aspect tend to become smaller. The carbon particle 8 having the average primary particle size falling within the range mentioned above can suppress these tendencies. The average primary particle size of the carbon particle 8 may be determined by a method similar to that in the case of the compound particles 4. The carbon particle 8 may be either a primary or secondary particle.

Preferably, the ratio D1/D2 of the average primary particle size D1 of the compound particles 4 to the average primary particle size D2 of the carbon particle 8 satisfies $0.03 \leq D1/D2 \leq 130$. This makes it easier to attain the advantageous effects of the second aspect. When the D1/D2 is too small, the compound particle 4 and carbon particle 8 tend to fail to come into sufficient contact with each other, thereby lowering the electronic conductivity of the active material. When the D1/D2 is too large, conductive networks tend to become insufficient in an active material layer formed from the active material, thereby lowering the electronic conductivity of the active material layer. The D1/D2 falling within the range mentioned above can suppress these tendencies.

Examples of the material constituting the carbon particle 8 include activated carbon, carbon black, graphite, soft carbon, and hard carbon. Among them, activated carbon or carbon black is preferably used. This makes it easier to attain the advantageous effects of the second aspect. Using acetylene black as carbon black makes it easier to attain the advantageous effects of the second aspect.

The active material 2 of the second embodiment can be used as an electrode material in an electrochemical device such as a lithium-ion secondary battery. More specifically, in a lithium-ion secondary battery comprising a negative electrode (anode), a positive electrode (cathode), and an ionically conductive electrolytic layer, in which the negative and positive electrodes oppose each other through the electrolytic layer interposed therebetween, the active material 2 of the second embodiment is contained in an active material layer of at least one of the negative and positive electrodes, for example. This can improve the discharge capacity and rate characteristic of the lithium-ion secondary battery. The active material 2 of the second embodiment is suitable as a positive electrode active material in particular.

Method of Manufacturing Active Material 2

The above-mentioned active material 2 of the second embodiment can be manufactured by the following manufacturing method.

The method of manufacturing the active material in accordance with the second embodiment comprises a hydrothermal synthesizing step of heating a mixture including a lithium compound, a first compound containing one species selected from the group consisting of Fe, Mn, Co, Ni, and V, a second compound containing one species selected from the group consisting of P, Si, S, V, and Ti, a carbon particle, and water under pressure; and a firing step of firing the mixture after the heating under pressure in the hydrothermal synthesizing step.

Materials for the Active Material 2

Examples of the lithium compound include $Li_2CO_3$, $LiOH.H_2O$, and lithium acetate, among which $LiOH.H_2O$ is preferably used in particular. This makes it easier to form the active material 2. Using $LiOH.H_2O$ can also reduce impurities in the resulting compound particles 4, whereby the capacitance density of the active material 2 can be increased. Further, the use of $LiOH.H_2O$ can adjust the pH of the mixture (aqueous solution to be explained later).

Examples of the first compound include $FeC_2O_4$, $FeCl_2$, $FeSO_4$, $Fe(NO_3)_2$, $Fe(NO_3)_3$, $FeCl_3$, $MnCl_2$, $CoCl_2$, $NiCl_2$, $V_2O_5$, and $NH_4VO_3$.

Examples of the second compound include $NH_4H_2PO_4$, $(NH_4)_2HPO_4$, $Li_2SiO_3$, $Li_2SO_4$, $V_2O_5$, $NH_4VO_3$, $TiO_2$, and tetraisopropoxytitanium.

Preferably, in the second embodiment, the first compound is $V_2O_5$, while the second compound is a phosphoric acid or a phosphate such as $NH_4H_2PO_4$ or $(NH_4)_2HPO_4$. This makes it possible to form the compound particles 4 made of a compound having a composition represented by $LiVOPO_4$.

Specific examples of the carbon particles include activated carbon, carbon black, graphite, soft carbon, and hard carbon. Among them, activated carbon or carbon black is preferably used. This makes it easier to form the active material 2. Using activated carbon or carbon black makes it possible to disperse the carbon particles uniformly in the above-mentioned mixture (aqueous solution to be explained later) at the time of hydrothermal synthesis. Using acetylene black as carbon black makes it easier to attain these advantageous effects.

Hydrothermal Synthesizing Step

First, in the hydrothermal synthesizing step, the above-mentioned lithium compound, first compound, second compound, carbon particle, and water are put into a reaction container (e.g., autoclave) which is adapted to heat and pressurize the inside, so as to prepare a mixture (aqueous solution) in which they are dispersed. The mixture may be prepared, for example, by refluxing a mixture of the first compound, second compound, and water at first and then adding the lithium compound and carbon particle thereto. The reflux can form a complex of the first and second compounds.

Compounding ratios of the lithium, first, and second compounds in the mixture may be adjusted such that the compound particles 4 in the resulting active material 2 attain the composition represented by the above-mentioned chemical formula (1).

Preferably, the carbon particle content in the mixture is adjusted such that the number of moles C of carbon atoms constituting the carbon particle and the number of moles M of metal elements contained in the first compound have a ratio C/M satisfying $0.05 \leq C/M \leq 1$. When the carbon particle content (number of moles C) is too small, the electronic conductivity and capacitance density tend to decrease in the active material. When the carbon particle content is too large, the weight of the compound particles in the active material tends to decrease relatively, thereby lowering the capacitance density of the active material. The carbon particle content falling within the above-mentioned range can suppress these tendencies.

Subsequently, the reaction container is hermetically closed, and the mixture is heated under pressure, so that a hydrothermal reaction proceeds in the mixture. This yields a precursor of the active material 2. In the precursor, a compound having a composition represented by the following chemical formula (1) and constituting the compound particles 4 in the active material 2 is hydrothermally synthesized:

$$Li_aMXO_4 \tag{1}$$

where a satisfies $0.9 \leq a \leq 2$, M denotes one species selected from the group consisting of Fe, Mn, Co, Ni, and VO, and X denotes one species selected from the group consisting of P, Si, S, V, and Ti.

Preferably, the pressure applied to the mixture in the hydrothermal synthesizing step is 0.2 to 1 MPa. When the pressure is too low, the crystallinity of the generated compound particles tends to decrease, thereby lowering the capacitance density of the generated active material. When the pressure is too high, the reaction container tends to require a higher pressure resistance, thereby increasing the cost for manufacturing the active material. The pressure falling within the above-mentioned range can suppress these tendencies.

Preferably, the temperature of the mixture in the hydrothermal synthesizing step is 150 to 200° C. When the temperature is too low, the crystallinity of the generated compound particles tends to decrease, thereby lowering the capacitance density of the active material. When the temperature is too high, the reaction container tends to require a higher pressure resistance, thereby increasing the cost for manufacturing the active material. The temperature falling within the above-mentioned range can suppress these tendencies.

Firing Step

In the firing step, the mixture (precursor of the active material 2) after the heating under pressure in the hydrothermal synthesizing step is fired. This yields the active material 2 in accordance with the second embodiment. That is, the fine compound particles 4 (e.g., fine crystals of $Li_aMXO_4$) having an average primary particle size of 0.03 to 1.4 µm can be generated on the surface of the carbon particle 8 through the hydrothermal synthesizing step and firing step.

Known as examples of conventional methods of manufacturing active materials are one mixing, pulverizing, and firing solids to become materials of $LiVOPO_4$, so as to atm particles of $LiVOPO_4$, and then mixing them with carbon, and one dissolving materials of $LiVOPO_4$ into water, evaporating the resulting solution to dryness, so as to form particles of $LiVOPO_4$, and then mixing them with carbon. However, it is difficult for these methods to form fine particles of $LiVOPO_4$ having an average primary particle size of 0.03 to 1.4 µm, not to mention making the surface of the carbon particle carry such fine particles of $LiVOPO_4$. On the other hand, the second embodiment can generate the compound particles 4 having an average primary particle size of 0.03 to 1.4 µm only when heating the lithium, first, and second compounds, which are materials of the compound particles 4, under pressure in the presence of the carbon particle 8 and water and then firing them.

Preferably, the firing temperature of the mixture in the firing step is 400 to 700° C. When the firing temperature is too low, the compound particles tend to grow insufficiently, thereby lowering the capacitance density of the active material. When the firing temperature is too high, the compound particles tend to advance gain growth and increase their particle size, thereby retarding the diffusion of lithium in the active material and lowering the capacitance density of the active material. The firing temperature falling within the above-mentioned range can suppress these tendencies.

Preferably, the firing time for the mixture is 3 to 20 hr. Preferably, the firing atmosphere for the mixture is a nitrogen atmosphere, argon atmosphere, or air atmosphere.

The mixture obtained by the hydrothermal synthesizing step may be heat-treated at about 60 to 150° C. for about 1 to 30 hr before being fired in the firing step. This heat treatment turns the mixture into a powder. Thus obtained powdery mixture may be fired. This can remove unnecessary moisture and organic solvent from the mixture, prevent impurities from being taken into crystals of the compound particles, and homogenize particle forms of the compound particles.

Though a preferred embodiment of the active material in accordance with the second aspect and the method of manufacturing the active material are explained in detail in the foregoing, the second aspect is not limited to the above-mentioned second embodiment.

For example, the active material of the second aspect may also be used as an electrode material for an electrochemical device other than lithium-ion secondary batteries. Examples of the electrochemical device include secondary batteries, other than the lithium-ion secondary batteries, such as metal lithium secondary batteries (using an electrode containing the active material of the second aspect as a cathode and metallic lithium as an anode) and electrochemical capacitors such as lithium capacitors. These electrochemical devices can be used for power supplies for self-propelled micromachines and IC cards, and decentralized power supplies placed on or within printed boards.

Examples of Second Aspect

The second aspect will now be explained more specifically with reference to Examples 11 to 17 and Comparative Examples 11 and 12, which do not restrict the second aspect.

Example 11

Hydrothermal Synthesizing Step

An aqueous $H_3PO_4$ solution prepared by dissolving 23.08 g of $H_3PO_4$ into 500 g of water was put into a 1.5-L autoclave container, and then 18.37 g of $V_2O_5$ were gradually added into the container. After completely adding $V_2O_5$, the container was hermetically closed, and the mixture was refluxed for 16 hr at 95° C./200 rpm. After the reflux, the container was once opened when the content in the container was cooled to room temperature. After adding 8.48 g of $LiOH.H_2O$ into the container, 1.0 g of carbon black was added thereto. Then, the container was closed again, the pressure within the container was set to 0.5 MPa, and the content was held for 8 hr while refluxing at 160° C./300 rpm. This yielded an active material precursor.

Subsequently, the active material precursor obtained by the hydrothermal synthesizing step was heat-treated for about 23 hr at 90° C. with an oven and then pulverized, so as to yield a gray powder.

Firing Step

Thus obtained powder was put into an alumina crucible, heated for 4 hr at 450° C., and then rapidly cooled. The powder was fired in an air atmosphere. In the firing step, the firing temperature was raised from room temperature to 450° C. in 45 min. The firing step yielded a brownish-red powder (active material of Example 11). The result of powder x-ray diffraction showed that the obtained brownish-red powder contained $\alpha LiVOPO_4$ crystals (triclinic crystals of $LiVOPO_4$).

Figure 5:
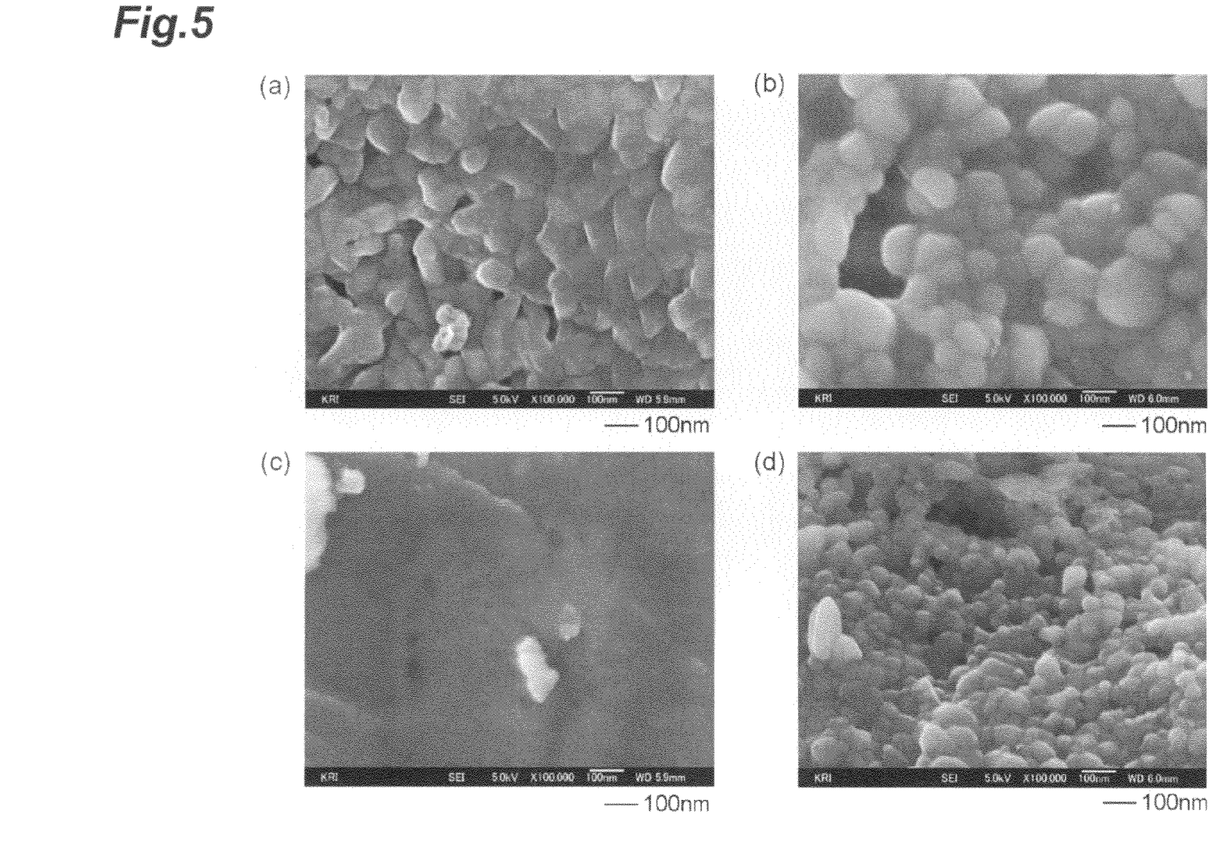
FIGS. 5(a), 5(b), 5(c), and 5(d) are SEM images of the active material in Example 11 of the second aspect.

Subsequently, thus obtained brownish-red powder was observed through an SEM (scanning electron microscope). FIGS. 5(*a*), 5(*b*), 5(*c*), and 5(*d*) illustrate images of the brownish-red powder photographed through the SEM. Also, the composition of the active material illustrated in FIGS. 5(*a*), 5(*b*), 5(*c*), and 5(*d*) was analyzed by SEM-EDS (energy-dispersive x-ray spectroscopy). As a result, it was seen that FIG. 5(*c*) was an image representing a surface of a carbon particle, while FIGS. 5(*a*), 5(*b*), and 5(*d*) were images representing states where a plurality of spherical crystals (compound particles) constituted by $\alpha LiVOPO_4$ were carried by the surface of the carbon particle.

Next, the length of the outer circumference of each of 20 compound particles illustrated in FIGS. 5(*a*), 5(*b*), and 5(*d*)

was determined, the diameter of each compound particle was calculated by assuming it to be a sphere, and thus calculated diameters were averaged as the average primary particle size. As a result, the average primary particle size of the compound particles was 0.2 μm in Example 11.

In view of the foregoing, the active material of Example 11 was seen to comprise a plurality of spherical crystals of αLiVOPO₄ having an average primary particle size of 0.2 μm and a carbon particle carrying the spherical crystals on the surface.

Making of an Evaluation Cell

The active material of Example 11 and a mixture of polyvinylidene fluoride (PVDF) and acetylene black as a binder were dispersed in N-methyl-2-pyrrolidone (NMP) serving as a solvent, so as to prepare a slurry. Here, the slurry was prepared such that the weight ratio of the active material, acetylene black, and PVDF became 84:8:8 therein. The slurry was applied onto an aluminum foil serving as a current collector, dried, and then extended by press, so as to yield an electrode (positive electrode) formed with an active material containing layer containing the active material of Example 11.

Subsequently, thus obtained electrode and an Li foil as its counter electrode were laminated while interposing therebetween a separator made of a microporous polyethylene film, so as to yield a multilayer body (matrix). This multilayer body was put into an aluminum laminator pack, a 1-M LiPF₆ solution was injected thereinto as an electrolytic solution, and then the pack was sealed under vacuum, so as to make an evaluation cell of Example 11.

Examples 12 to 15

The active material obtained by the same method as that of Example 11 was further subjected to airflow classification, so as to yield active materials of Examples 12 to 15 comprising carbon particles carrying compound particles having average primary particle sizes listed in Table 2. As a result of an analysis similar to that of Example 11, it was found that an active material comprising a plurality of spherical crystals of αLiVOPO₄ and a carbon particle carrying the spherical crystals on the surface was obtained in each of Examples 12 to 15. The average primary particle size of compound particles in each of Examples 12 to 15 was verified by the same method as that of Example 11. Table 2 lists the results.

Example 16

An active material of Example 16 was obtained by the same method as that of Example 11 except that the heating temperature of the autoclave container (temperature at the time of refluxing the content of the container) after adding carbon black in the hydrothermal synthesizing step was 130° C. As a result of an analysis similar to that of Example 11, it was found that an active material comprising a plurality of spherical crystals of αLiVOPO₄ and a carbon particle carrying the spherical crystals on the surface was also obtained in Examples 16. The average primary particle size of compound particles in Example 16 was verified by the same method as that of Example 11. Table 2 lists the result.

Example 17

An active material of Example 17 was obtained by the same method as that of Example 11 except that the heating temperature of the autoclave container (temperature at the time of refluxing the content of the container) after adding carbon black in the hydrothermal synthesizing step was 180° C. As a result of an analysis similar to that of Example 11, it was found that an active material comprising a plurality of spherical crystals of αLiVOPO₄ and a carbon particle carrying the spherical crystals on the surface was also obtained in Examples 17. The average primary particle size of compound particles in Example 17 was verified by the same method as that of Example 11. Table 2 lists the result.

Next, respective evaluation cells equipped with positive electrodes formed with active material containing layers containing the active materials of Examples 12 to 17 were made by the same method as that of Example 11.

Comparative Example 11

Water was evaporated from a solution in which LiNO₃, V₂O₅, and H₃PO₄ had been dissolved at a molar ratio of 2:1:2 in water, so as to dry the dissolved matter. The dried matter was further dried for one night, pulverized, and then fired at 700° C., so as to yield compound particles of Comparative Example 11. The result of powder x-ray diffraction showed that the compound particles of Comparative Example 11 were αLiVOPO₄ crystals (triclinic crystals of LiVOPO₄). The average primary particle size of the compound particles of Comparative Example 11 determined by the same method as that of Example 11 was 1.5 μm.

Next, an evaluation cell of Comparative Example 11 was made by the same method as that of Example 11 except that the compound particles of Comparative Example 11 and carbon black were contained in the active material containing layer.

Comparative Example 12

Compound particles of Comparative Example 12 were obtained by the same method as that of Example 11 except that an active material precursor was yielded without adding carbon black into the autoclave container in the hydrothermal synthesizing step and that the heating temperature of the autoclave container was 130° C. The result of powder x-ray diffraction showed that the compound particles of Comparative Example 12 were αLiVOPO₄ crystals (triclinic crystals of LiVOPO₄). The average primary particle size of the compound particles of Comparative Example 12 determined by the same method as that of Example 11 was 0.02 pa.

Next, an evaluation cell of Comparative Example 12 was made by the same method as that of Example 11 except that the compound particles of Comparative Example 12 and carbon black were contained in the active material containing layer.

Measurement of Discharge Capacity and Rate Characteristic

For each of the evaluation cells of Examples 11 to 17 and Comparative Examples 11 and 12, the discharge capacity (unit: mAh/g) at a discharge rate of 0.1 C (the current value at which constant current discharging at 25° C. completes in 10 hr) and the discharge capacity at a discharge rate of 1 C (the current value at which constant current discharging at 25° C. completes in 1 hr) were measured. Table 2 lists the discharge capacity at 0.1 C. The ratio (%) of the discharge capacity at 1 C to the discharge capacity at 0.1 C taken as 100% was determined as the rate characteristic. Table 2 lists the results. Here, the higher the discharge capacity and rate characteristic become, the more preferred they are.

TABLE 2

|  | Particle size of compound particle (μm) | Discharge capacity (mAh/g) | Rate characteristic (%) |
|---|---|---|---|
| Example 11 | 0.2 | 103 | 88 |
| Example 12 | 0.1 | 110 | 90 |
| Example 13 | 0.5 | 105 | 83 |
| Example 14 | 0.05 | 98 | 91 |
| Example 15 | 0.8 | 93 | 77 |
| Example 16 | 0.2 | 92 | 81 |
| Example 17 | 0.2 | 99 | 83 |
| Comparative Example 11 | 1.5 | 82 | 67 |
| Comparative Example 12 | 0.02 | 78 | 89 |

As listed in Table 2, it was seen that the discharge capacity and rate characteristic were lower in Comparative Example 11 than in Examples 11 to 17. It was also seen that the discharge capacity was lower in Comparative Example 12 than in Examples 11 to 17.

What is claimed is:

1. An active material comprising:
a compound particle containing $LiVOPO_4$;
a carbon layer covering the compound particle; and
a carbon particle,
wherein:
the carbon layer has an average thickness of 1 to 30 nm;
the compound particle has an average primary particle size D1, the carbon particle has an average primary particle size D2, and the ratio D1/D2 satisfies $0.03 \leq D1/D2 < 1$.

2. The active material according to claim 1, wherein the compound particle is a primary particle.

3. The active material according to claim 1, wherein the carbon particle has an average primary particle size of 10 to 100 nm.

4. The active material according to claim 1, wherein the compound particle is carried by a surface of the carbon particle.

5. A method of manufacturing an active material comprising:
a hydrothermal synthesizing step of heating a mixture including a lithium compound, a first compound containing V, a second compound containing P, an organic compound, a carbon particle, and water under pressure; and
a firing step of firing the mixture after the heating under pressure in the hydrothermal synthesizing step;
wherein:
the active material comprises:
a compound particle containing $LiVOPO_4$;
a carbon layer covering the compound particle; and
a carbon particle;
the carbon layer has an average thickness of 1 to 30 nm;
the compound particle has an average primary particle size D1, the carbon particle has an average primary particle size D2, and the ratio D1/D2 satisfies $0.03 \leq D1/D2 < 1$.

6. The method of manufacturing an active material according to claim 5, wherein:
the first compound is $V_2O_5$; and
the second compound is a phosphoric acid or phosphate.

7. The method of manufacturing an active material according to claim 5, wherein the organic compound is an organic acid or alcohol.

8. The method of manufacturing an active material according to claim 7, wherein the organic acid is ascorbic acid.

9. The method of manufacturing an active material according to claim 5, wherein the carbon particle is carbon black.

10. The method of manufacturing an active material according to claim 5, wherein the lithium compound is $LiOH \cdot H_2O$.

11. An active material comprising:
a carbon particle; and
a compound particle having an average primary particle size, D1, of 0.03 to 1.4 μm, being carried by a surface of the carbon particle, and containing $LiVOPO_4$,
wherein the carbon particle has an average primary particle size D2, and the ratio D1/D2 satisfies $0.03 \leq D1/D2 < 1$.

12. The active material according to claim 11, wherein the average primary particle size of the carbon particle is 0.01 to 1 μm.

13. A method of manufacturing an active material comprising:
A hydrothermal synthesizing step of heating a mixture including a lithium compound, a first compound containing one species selected from the group consisting of Fe, Mn, Co, Ni, and V, a second compound containing one species selected from the group consisting of P, Si, S, V, and Ti, a carbon particle, and water under pressure; and
a firing step the mixture after the heating under pressure in the hydrothermal synthesizing step;
wherein:
the active material comprises:
a carbon particle; and
a compound particle having an average primary particle size, D1, of 0.03 to 1.4 μm, being carried by a surface of the carbon particle, and containing $LiVOPO_4$; and
the carbon particle has an average primary particle size D2, and the ratio D1/D2 satisfies $0.03 \leq D1/D2 < 1$.

14. The method of manufacturing an active material according to claim 13, wherein:
the first compound is $V_2O_5$; and
the second compound is a phosphoric acid or phosphate.

15. The method of manufacturing an active material according to claim 13, wherein the carbon particle is activated carbon or carbon black.

16. The method of manufacturing an active material according to claim 13, wherein the lithium compound is $LiOH \cdot H_2O$.

* * * * *